United States Patent [19]

Shelton

[11] 4,102,566

[45] Jul. 25, 1978

[54] RIMLESS SPECTACLE

[75] Inventor: Robert N. Shelton, Leominster, Mass.

[73] Assignee: Foster Grant Corporation, Leominster, Mass.

[21] Appl. No.: 792,622

[22] Filed: May 2, 1977

[51] Int. Cl.² ............................ G02C 1/04; G02C 5/02
[52] U.S. Cl. .................................... 351/131; 351/132; 351/103
[58] Field of Search ............... 351/103, 124, 131, 132; 2/445, 446

[56] References Cited

U.S. PATENT DOCUMENTS

| 1,789,937 | 1/1931 | Curran | 351/132 |
|---|---|---|---|
| 3,758,203 | 9/1973 | Lipchik et al. | 351/132 X |

Primary Examiner—Paul A. Sacher
Assistant Examiner—Rodney B. Bovernick
Attorney, Agent, or Firm—Leonard S. Selman

[57] ABSTRACT

A rimless spectacle including a light weight two member lens supporting nose bridge assembly which engages the brow bar at its upper end and includes a pair of nose engaging pad members extending from its bottom end.

7 Claims, 6 Drawing Figures

RIMLESS SPECTACLE

BACKGROUND OF THE INVENTION

This invention relates to so-called "rimless" spectacles wherein instead of the lenses having the edges thereof held in grooves in a surrounding plastic or metal surrounding frame, the lenses are only connected at selected points to a supporting means such as a brow bar for holding them in their proper optical position before the wearer's eyes. Of special interest is the use of such structure in a sunglass type spectacle. Certain advantages of this "rimless" construction include the lighter weight and resulting comfort thereof as well as their very stylish appearance.

In such rimless spectacles or sunglasses it is important that each element thereof be constructed to provide the style and lightweight desired. Thus the various elements such as the bar joining the lenses as well as the nosebridge for supporting the spectacles comfortably on the nose of the wearer should be such as to provide an attractive overall appearance as well as economy in construction and effectiveness of function.

OBJECTS AND SUMMARY OF THE INVENTION

An object of the present invention is to provide a rimless spectacle which is lightweight and attractive in appearance.

It is another object to provide a rimless spectacle which is economical to manufacture due to its simplicity in structure.

It is a further object of this invention to provide a rimless spectacle having a unique nosebridge assembly for supporting and joining the spectacle lenses at the central portion of the spectacle assembly and for supporting the spectacles comfortably on the nose of the wearer.

Pursuant to the above and other objects the present invention provides a novel rimless spectacle front lens supporting assembly including a pair of lenses connected to a bar which extends across the brow of the wearer positioning the lenses before the wearer's eyes. In the central bridge area the lenses reside in contiguous relationship for a distance downwardly from their top edges. A novel nosebridge assembly is provided which includes front and back members which are uniquely joined together clamping the contiguous portions of the lenses therebetween. The nosebridge assembly thus supports the lenses and it in turn is connected to and supported by the brow bar at the upper portion thereof. A pair of nose engaging pad members extend downwardly from the lower portion thereof to support the lightweight assembly on the nose of the wearer.

DESCRIPTION OF THE INVENTION

Figure 1:
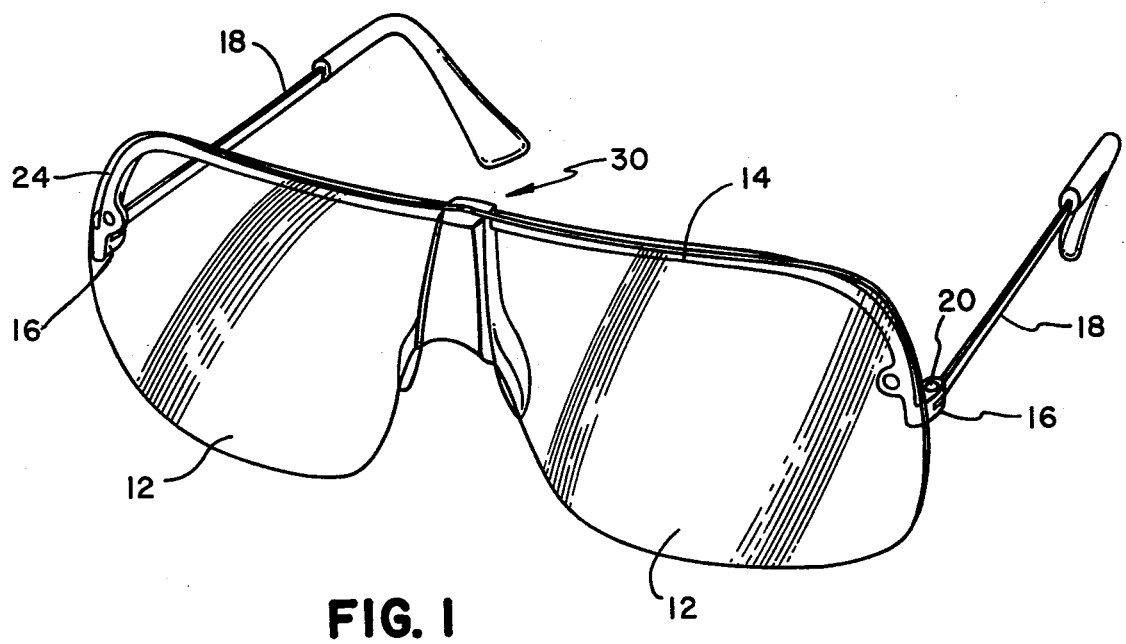
FIG. 1 is a perspective view of the rimless spectacles embodying the invention.
Figure 2:
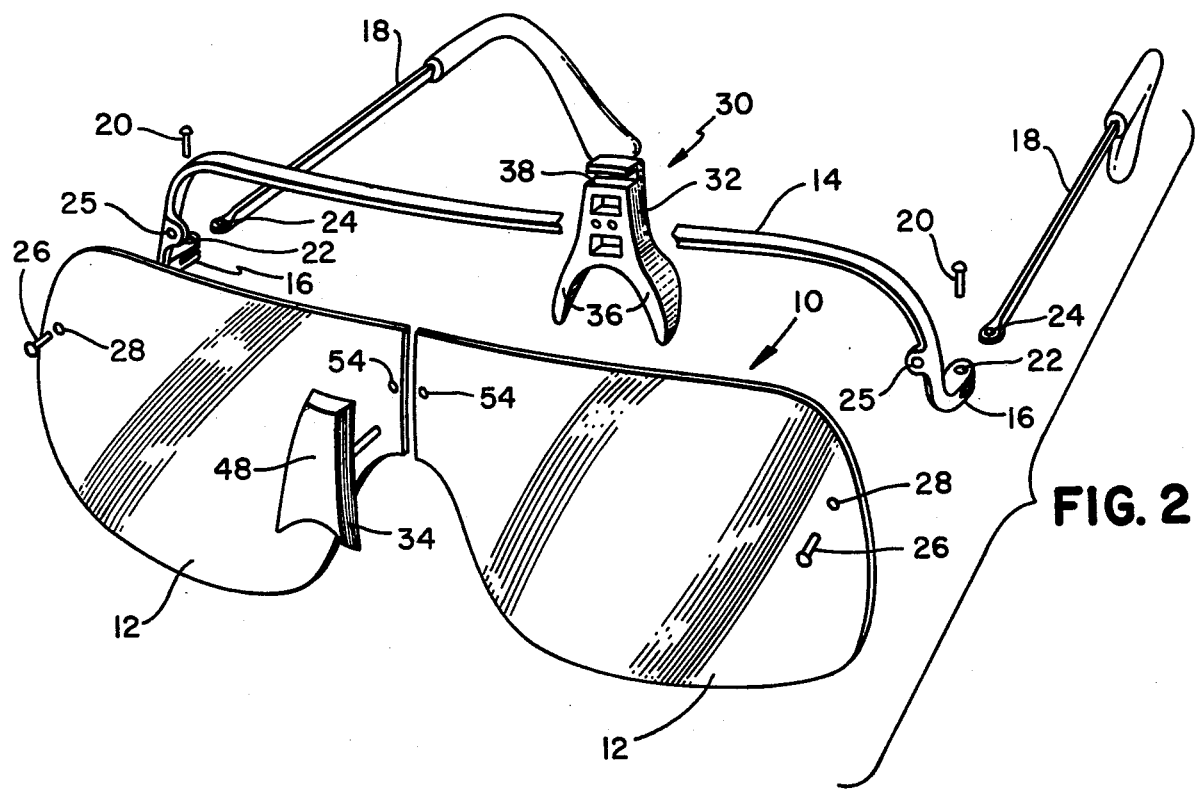
FIG. 2 is a perspective view of the principal elements of the spectacles separated in space to illustrate them more clearly.
Figure 3:
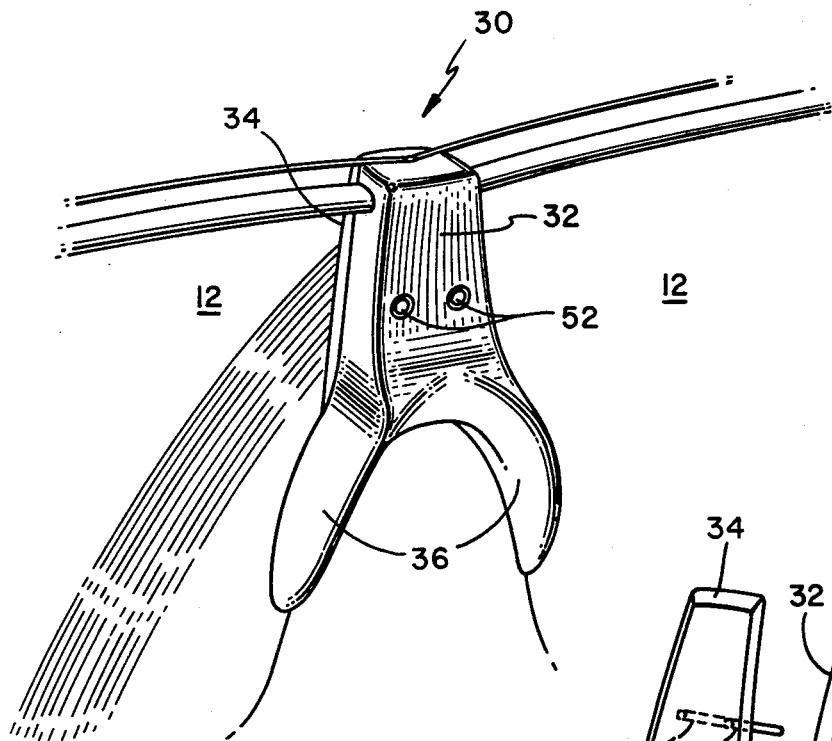
FIG. 3 is a sectional fragmentary perspective view of the spectacle nosebridge assembly from the rear.

With reference now to the drawing and more particularly to FIG. 1 embodiment of the present invention is illustrated generally at 10 and comprises a pair of lenses 12 supported by a brow bar 14. As show also in FIG. 2, brow bar 14 is a unitary member preferably of cast metal which extends horizontally across the top edge of the lenses and bends downwardly at each end terminating in a pair of hinge knuckles 16 for receiving therebetween the end portions of a pair of temples 18. A rivet pin 20 extends through the opening 22 knuckles 16 and opening 24 in temples 18 to pivotally connect the temples to the brow bar.

The brow bar 14 includes a pair of inwardly extending lugs 25 having openings for receiving rivet pins 26 which pass thru openings 28 in lenses 12 for connecting the lenses to the brow bar at each end thereof. At the central portion the brow bar 14 and the lens are connected to the novel nosebridge assembly 30.

The nosebridge assembly 30, as shown in FIGS 1–5 includes a rear member 32 and a front member 34. The rear member 32 has a pair of nose engaging members 36 extending like two curved fingers at the bottom portion thereof. At the top portion of said rear member there is a groove 38 for receiving the brow bar 14 therein. The central or lens clamping portion of rear member 32 comprises a lens engaging surface 40 having a pair of centrally located pin receiving openings 44 therein and a pair of square shaped indentations 46 spaced one each above and below said openings 44.

Figures 4, 5:
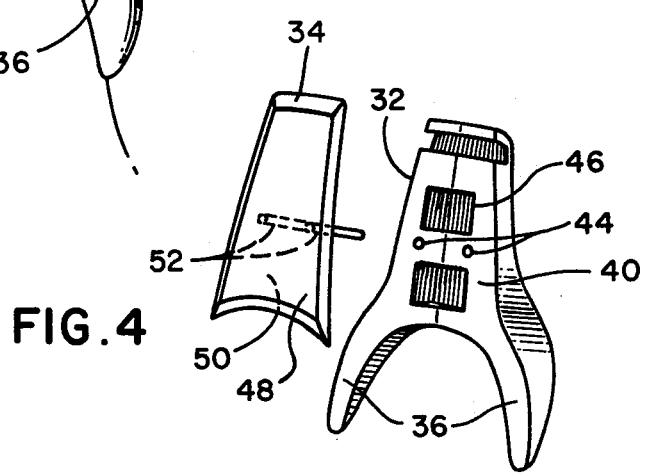
FIG. 4 is an enlarged perspective view of the front member of the nose assembly.
FIG. 5 is an enlarged perspective view of the rear member of the nosebridge assembly.

FIG. 4 of the drawing illustrates the front member 34 of the nosebridge assembly 30. Member 34 includes an outer surface 48 which may be sprayed with a decorative coating if desied. The inner surface 50 of said member 34 serves as a clamping portion which engages the lens and holds it against the lens clamping portion 40 of rear member 32. Extending from the surface 50 are two pin members 52.

In assembling the spectacles, the lenses 12 ae provided with a pair of openings 54 and the pin members 52 pass first through the openings 54 and then through the openings 44 in rear member 32 of the nosebridge assembly. The rear member 32 is positioned to receive the brow bar 14 in its groove 38. To complete the assembly operation the end portions of the pin members are cut off and swagged over to form a locking lip to permanently clamp the front member 34 to the rear member 32 of the nosebridge assembly with the lenses 12 therebetween.

Figure 6:
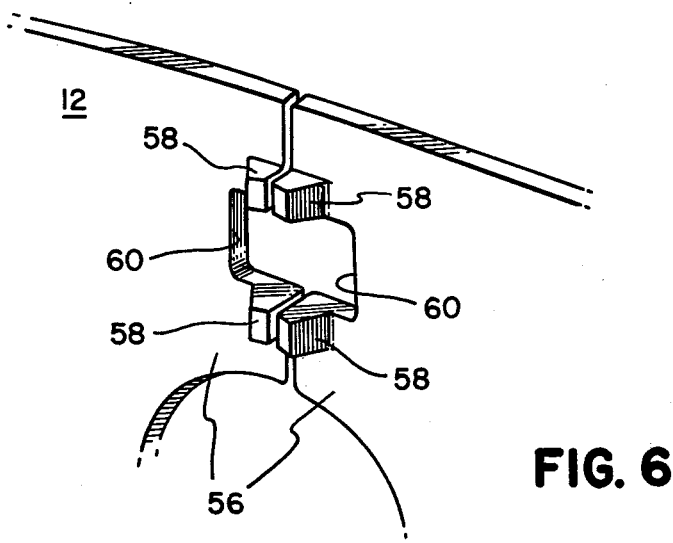
FIG. 6 is a perspective fragmentary view of a portion of a pair of alternate lenses for said spectacles including means cooperating with said nosebridge assembly.

FIG. 6 of the drawing illustrates a modification of the invention wherein a pair of lenses 56 are utilized instead of lenses 12. Lenses 56 are each provided at the central bridge area with a pair of vertically spaced small rectangular shaped lugs 58 extending rearwardly at the edge portion where they adjoin the adjacent lens as shown in FIG. 6. There is a u-shaped cut-out portion 60 provided in between the vertically spaced lugs 58. Thus in assembled relationship the pins members 52 pass through the cut-out portions 60 and are engaged in the pin receiving openings 44 and swagged over in the manner described above clamping the lenses 56 between members 32 and 34. The lugs 58 of the lenses are each received in the square shaped indentions 46 provided in the rear member 32 of the nosebridge assembly. One lug 58 from each lens is received in each of the indentions so that the two lugs, one from each of the adjacent lenses 56 are clamped in side-by-side relationship in each of the pair of indentions 46.

Thus the objects of the invention are achieved by the described rimless spectacle structure as shown and described and which cooperate in a novel manner to achieve the desired result.

I claim:

1. A rimless spectacle assembly comprising:

a pair of lenses residing in contiguous edgewise relation for a distance downwardly from the top contour edges of the lenses at the central bridge area of said assembly;

a brow bar extending across the width of said spectacle assembly along the upper edge of said pair of lenses, said brow bar bending downwardly at each end thereof along the side edges of each of said lenses and including portions of said brow bar to which said lenses are connected to near each end thereof and a pair of hinge portions extending rearwardly from the extreme opposite end portions of said brow bar;

a pair of temples pivotly connected to said hinge portions at each end of said brow bar;

a nose bridge assembly consisting of a rear member and a front member;

said rear member including a connecting portion at the upper end thereof engaging said brow bar, a pair of nose engaging pad members extending finger-like from the bottom of said rear member and a central lens engaging portion;

said front member including a lens engaging portion and means for connecting said rear member of said nose bridge assembly with said front member thereof with contiguous portions of said lenses clamped between said lens engaging portions of said front and rear members of said nose bridge assembly.

2. The rimless spectacle assembly of claim 1 wherein said front member of said nose bridge assembly includes at least one pin member extending rearwardly therefrom and said rear member of said nose bridge assembly includes at least one pin receiving opening for receiving and permanently engaging said pin member for joining said front and rear members of said nose bridge assembly.

3. The rimless spectacle assembly of claim 2 wherein a pair of pin members extend rearwardly from said front member of said nose bridge assembly and said rear member thereof includes a pair of pin receiving openings each opening receiving and permanently engaging a pin member.

4. The rimless spectacle assembly of claim 3 wherein each of said pair of lenses has an opening therein at the central bridge area through which one of said pin members passes through.

5. The rimless spectacle assembly of claim 4 wherein the end of each of said pin members that pass through said lens opening and said openings in said rear member of said nose bridge assembly are swagged over to form a locking lip to lock said pin members within said openings.

6. The rimless spectacle assembly of claim 3 wherein said rear member of said nose bridge assembly includes at least one indention therein and each of said pair of lenses includes at least one rearwardly extending lug at the central bridge area thereof, said lug of each lens being positioned in side-by-side relationship with an adjacent lug of said other lens within said indentation when said lenses are clamped between said lens engaging portions of said front and rear members of said nose bridge assembly.

7. The rimless spectacle assembly of claim 6 wherein each of said pair of lenses include a pair of vertically spaced rearwardly extending lugs and said rear members includes a pair of vertically spaced indentations for receiving said lugs from each lens in said side-by-side relationship.

* * * * *